(12) United States Patent
Lopes

(10) Patent No.: US 7,669,885 B2
(45) Date of Patent: Mar. 2, 2010

(54) EASILY-BREAKABLE INFLATABLE AIRBAG CASE

(75) Inventor: Albert Lopes, Saint Leu la Foret (FR)

(73) Assignee: Demo Injection, Chambly (FR)

( * ) Notice: Subject to any disclaimer, the term of this patent is extended or adjusted under 35 U.S.C. 154(b) by 0 days.

(21) Appl. No.: 12/278,591

(22) PCT Filed: Feb. 20, 2007

(86) PCT No.: PCT/FR2007/000305
§ 371 (c)(1),
(2), (4) Date: Aug. 7, 2008

(87) PCT Pub. No.: WO2007/096516
PCT Pub. Date: Aug. 30, 2007

(65) Prior Publication Data
US 2009/0033069 A1    Feb. 5, 2009

(30) Foreign Application Priority Data
Feb. 22, 2006    (FR) .................................. 06 01555

(51) Int. Cl.
*B60R 21/20* (2006.01)
(52) U.S. Cl. .................................................. 280/728.3
(58) Field of Classification Search ............... 280/728.3, 280/732, 731; 180/90
See application file for complete search history.

(56) References Cited

U.S. PATENT DOCUMENTS 7,063,349 B2 * 6/2006 Takahashi ................ 280/728.2
2004/0140652 A1   7/2004 Takahashi

FOREIGN PATENT DOCUMENTS

EP    1 393 990    3/2004

* cited by examiner

*Primary Examiner*—Faye M. Fleming
(74) *Attorney, Agent, or Firm*—Oblon, Spivak, McClelland, Maier & Neustadt, L.L.P.

(57) ABSTRACT

An airbag case includes a line of weakness which enables the case to be ruptured under the effect of a force exerted by the airbag during inflation of the airbag. The line of weakness is formed by a junction, by injection, of two layers of material defining respective parts of the surface area of the case.

14 Claims, 2 Drawing Sheets

EASILY-BREAKABLE INFLATABLE AIRBAG CASE

BACKGROUND OF THE INVENTION

I. Field of the Invention

The present invention relates to a wall made of injection moulded thermoplastic material, in particular an inflatable air bag cover for vehicles, designed so as to rupture along a predefined line of weakness under the action of a force acting on one face of the wall.

II. Description of Related Art

An inflatable safety air bag for vehicles is normally contained, before use, in a space bounded by a cover made of injection moulded plastic material. When the air bag is inflated by a gas under the action of a collision, it exerts a pressure on the internal surface of the cover, thereby rupturing the latter and enabling the air bag to unfold in the passenger compartment of the vehicle. In order to obtain a clearly defined rupture of the cover, a line of weakness is normally provided in the form of a localised reduction in thickness.

Such a localised reduction in thickness involves a restriction of the movement of material during the fabrication of the cover by injection moulding, leading to defects in the appearance and to stresses in the material.

BRIEF SUMMARY OF THE INVENTION

The object of the invention is to rectify these disadvantages.

The invention relates in particular to a wall of the type defined in the introduction, and envisages that the line of weakness is formed by the junction, by injection, of two layers of material defining respective parts of the surface area of the wall.

Optional additional or alternative characteristic features of the invention are disclosed hereinafter:

- at least one of the said layers is formed of a mixture comprising at least one plastomer and at least one elastomer.
- the said mixture comprises polypropylene as the plastomer.
- the said mixture comprises a styrene-ethylene-butene-styrene copolymer sequence as the plastomer.
- the said layers have in their junction zone co-operating shapes producing a mechanical interlocking effect.
- the said mechanical interlocking is produced in the vicinity of a single face of the wall.
- A first of the said layers has a rib extending substantially parallel to the faces of the wall and spaced from the latter, enclosed between two regions of the second layer which are joined to one another by means of a through hole made in the rib.
- the rib has an enlargement situated beyond the said hole with respect to the remaining part of the first layer.
- the said mechanical interlocking is produced in the vicinity of the internal surface of the inflatable air bag cover.
- the thickness of the wall along the line of weakness is substantially equal to the thickness of each of the layers in the vicinity of their junction zone.
- the materials of the two layers have a different appearance, in particular a different colour.

The invention also provides a process for producing a wall as defined above, comprising the following steps:

a) formation of a first moulding cavity by co-operation of a first mould part and a second mould part, and filling of the first cavity by injection of material so as to form a first layer in a first moulding step;

b) after cooling the injected material, separation of the first and second mould parts, the first layer remaining attached to the first mould part;

c) formation of a second moulding cavity by co-operation of the first mould part and a third mould part, the said second cavity having substantially the dimensions of the wall to be formed and being occupied on a part of its surface area and over its whole thickness by the first layer, and filling of the remaining volume of the second cavity by injection of material so as to form a second layer in a second moulding step.

The process according to the invention can include at least some of the following specific features:

- the first mould part comprises at least one movable element that projects into the first moulding cavity during the first moulding step and which is withdrawn so as to free the second moulding cavity during the second moulding step.
- the said movable element is a sliding pin, the end of which defines a surface of the said rib and comes into contact during the first moulding step with a stud of the second mould part containing the said through hole, a side face of the said pin delimiting if necessary the said enlargement.
- the materials are injected at a temperature between about 180° and 240° C.

The characteristic features and advantages of the invention are described in more detail hereinafter in the following description and with reference to the accompanying drawings, in which:

DETAILED DESCRIPTION OF THE INVENTION

Figure 1:
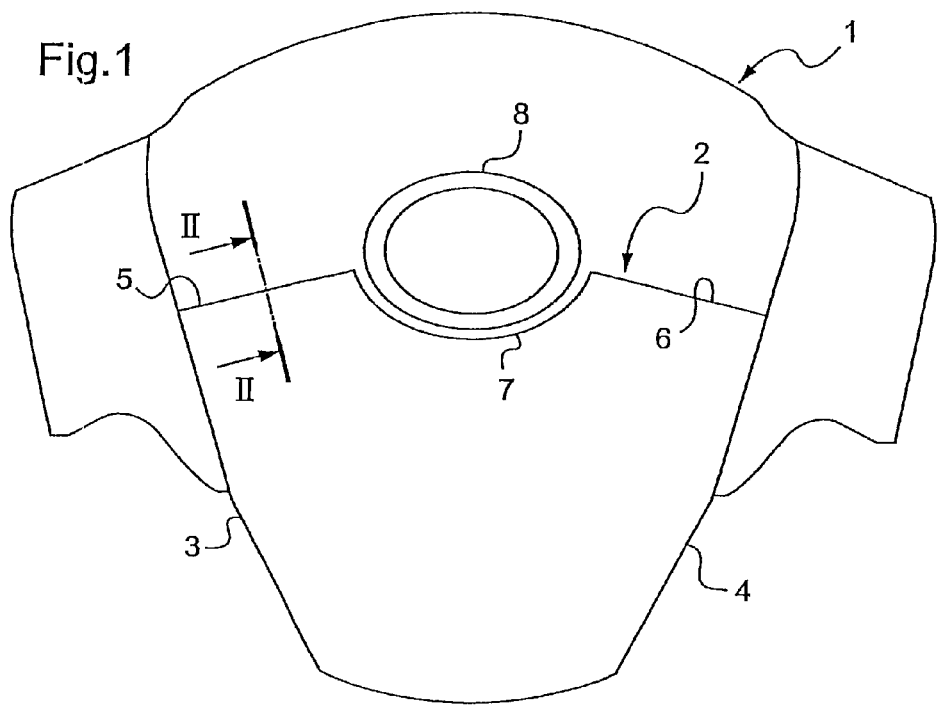
FIG. 1 is a view of the outer surface of an inflatable air bag cover for vehicles, according to the invention.
Figure 2:
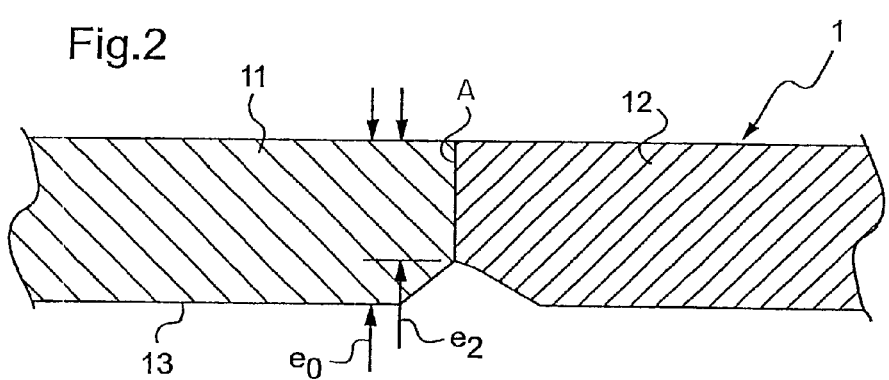
FIG. 2 is a sectional view along the line II-II of FIG. 1.
Figure 3:
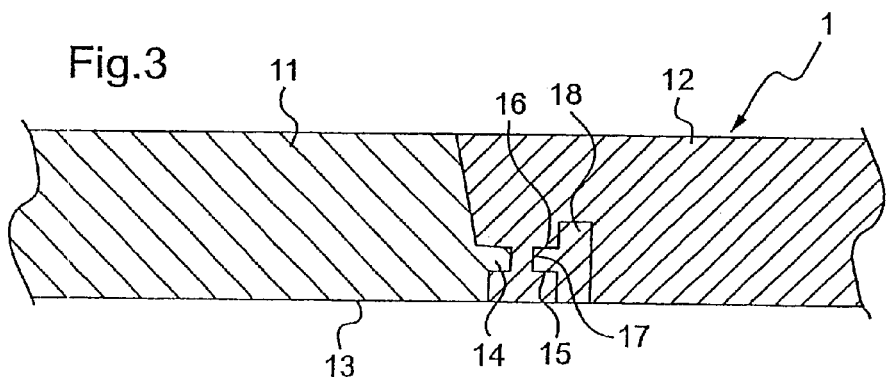
FIG. 3 is a similar view to FIG. 2, relating to another inflatable air bag according to the invention.
Figure 6:
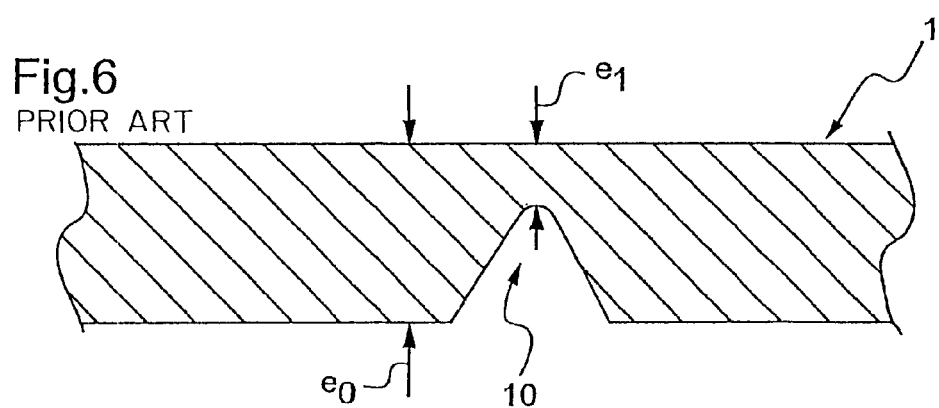
FIG. 6 is a similar view to FIG. 2 relating to a cover of the prior art.

FIG. 1 shows an inflatable air bag cover 1 viewed from the outside, that is to say from the passenger compartment of the vehicle when it is installed, this view corresponding moreover to a cover according to the invention, as shown in cross-section in FIG. 2 or in FIG. 3, as well as to a cover of the prior art as shown in cross-section in FIG. 6.

The cover 1 has in a manner known per se a line of weakness 2, which is shown for the purposes of illustration as a line, but of course in reality is not visible. In the present case the line 2 extends continuously from a left-hand edge 3 to a right-hand edge 4 of the cover, and is formed by two segments of lines 5, 6 adjacent respectively to the edges 3 and 4, and connected to one another by an arc 7 surrounding a central panel 8 that can contain identifying details relating to the equipment.

FIG. 6 shows the conventional way of producing the line of weakness 2, in the form of a zone of reduced thickness 10, with the disadvantages mentioned hereinbefore.

According to the invention, the line of weakness is formed by the junction of two layers of material 11 and 12 injected separately. The materials of the layers 11 and 12 will thus bond with one another at an interface A.

The rupture of the cover during the inflation of the air bag is thus effected by the separation of the two layers along the interface A and no longer by the effect of tearing a single layer.

In FIG. 2 the minimum thickness of the cover along the line of weakness 2 corresponds to the thickness $e_2$ over which the interface A extends, which is slightly less than the total thickness $e_0$ of the cover, in contrast to the cover in FIG. 6, in which the minimal thickness $e_1$ is small in relation to the total thickness $e_0$. Nevertheless, the rupture can be achieved by the same force exerted by the air bag, or even by a lesser force, by virtue of the limited mutual adherence of the two layers. The rupture force can be adjusted by altering the degree of compatibility of the materials of the two layers, which can be identical or different, and by altering the minimal thickness in the junction zone, which can be as large as the maximum thickness $e_0$ of the cover.

Advantageously, as is known per se, one at least of the said layers, and preferably both layers, consist of a mixture comprising at least one plastomer and at least one elastomer, these terms denoting organic polymers that are solid at normal temperature, and whose deformation under stress is principally plastic and elastic respectively.

As examples of plastomers, there may be mentioned in particular polypropylene (PP), or also a styrene-ethylene-butene-styrene copolymer sequence (SEBS).

As examples of elastomers, there may be mentioned in particular thermoplastic elastomers (TPE), thermoplastic elastomers based on styrene (TPEs), olefinic thermoplastic elastomers (TPO), vulcanised thermoplastic elastomers (TPV) and polyurethane elastomers (TPU).

The mixtures that are used are advantageously "compounds" having both elastomer and plastomer properties, such as for example an elastomeric compound based on polypropylene-styrene-ethylene-butene-styrene (PP SEBS), or also a polypropylene-ethylene-propylene-diene monomer compound (PP/EPDM).

The two layers can also consist of the same mixture, for example PP SEBS compound/PP SEBS compound, or of two different mixtures, for example PP SEBS compound/PP EPDM compound.

The cover of FIG. 3 differs from that of FIG. 2 in that its thickness is uniform, and consequently there is no decrease in thickness in the layer junction zone, and in that the layers 11 and 12 exhibit in their junction zone particular shapes that produce a mechanical interlocking. More particularly, the layer 11 has in the vicinity of the internal surface 13 of the cover a rib 14 comprising two planar surfaces 15, 16 parallel to the plane of the surface 13. Holes 17 distributed along the line of weakness pass through the rib from the surface 15 to the surface 16. Beyond the holes 17 in relation to the main part of the layer 11, the rib has an enlarged marginal zone 18 that extends beyond the surface 15 as far as the surface 13, and beyond the surface 16, over a whole thickness that is less than half the thickness of the cover. The rib 14, with the exception of the zone 18, is enclosed between two regions of the layer 12 connected to one another via the holes 17, thereby producing a mechanical interlocking of the layers that increases the force that has to be exerted from outside in order to rupture the cover, thus reducing the risk of an accidental rupture.

The process for producing the cover of FIG. 3 will now be described with reference to FIGS. 4 and 5.

Figure 4:
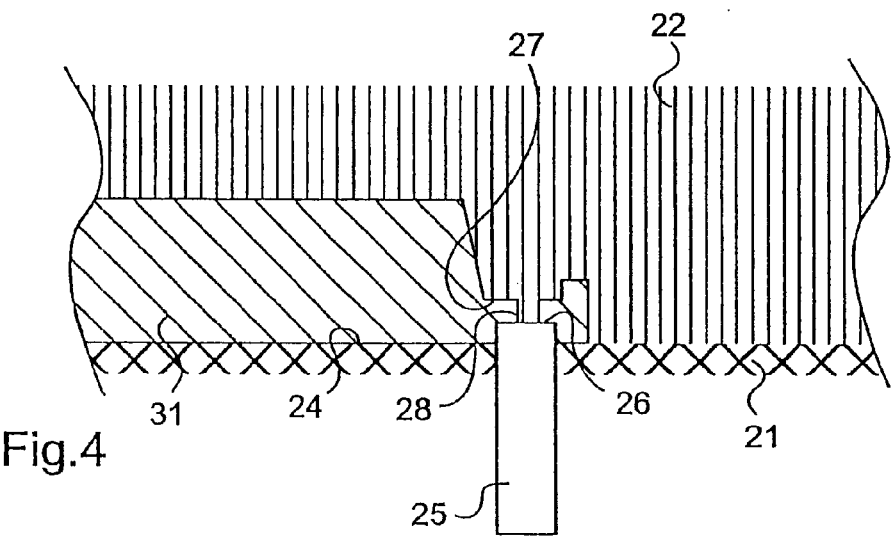
FIGS. 4 and 5 are partial sectional views showing two successive steps in the fabrication, by injection, of the cover of FIG. 3.
Figure 5:
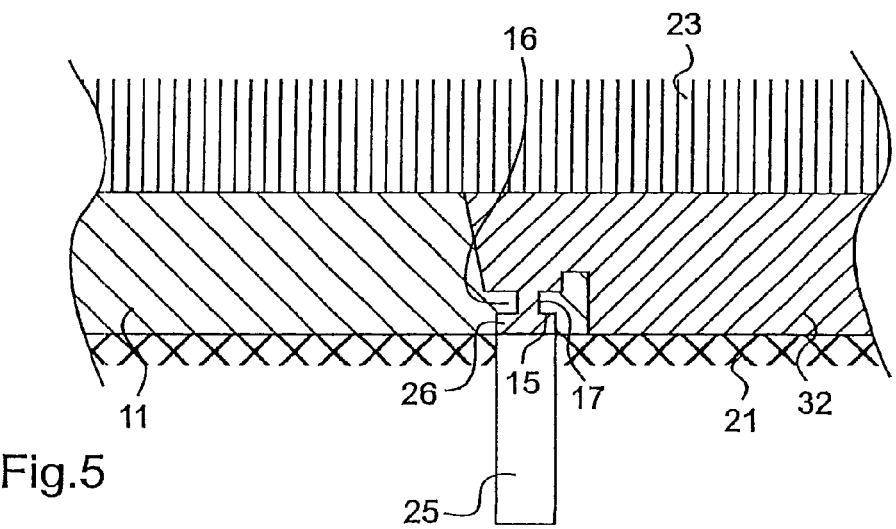

In FIG. 4 a first mould part 21 and a second mould part 22 define between them a first moulding cavity which is filled, during a first moulding step, with an injected material 31 forming the first layer 11. The part 21 has a planar surface 24 intended to define the internal surface 13 of the cover, from which projects a movable pin 25 that can slide with respect to the part 21 perpendicularly to the plane of the surface 24, this sliding direction also corresponding to the opening/closing direction of the injection mould. The end 26 of the pin 25 defines the surface 15 of the rib 14, the opposite surface 16 of which is defined by a boss 27 of the mould part 22, beyond which project studs 28 that come to bear against the end 26 and that define the holes 17 passing through the rib. The enlarged region 18 of the rib is partly delimited by the side surfaces of the pin 25 and of the boss 27.

After cooling of the material 31, the mould part 22 is removed, the first layer 11 remaining attached to the mould part 21, and a third mould part 23 now co-operates with the part 21 so as to form a new mould cavity that is larger than the previous cavity, which is occupied over a part of its surface area and over its whole width by the first layer 11, the remaining volume of this cavity then being filled by injecting a material 32 defining the second layer 12. During this second moulding step the pin 25 is withdrawn so that its end 26 is situated in the plane of the surface 24 of the part 21, thereby allowing the material 32 to pass through the holes 17 of the rib 16 and fill the volume between the surface 15 of the rib and the end 26 of the pin.

Apart from the advantages mentioned hereinbefore, the invention enables, by a suitable choice of the constituent materials of the two layers, them to have a different appearance, in particular a different colour, for example for decorative purposes, without having to carry out a subsequent treatment. Layers thereby having a different colour can be coated with a colourless varnish.

The invention claimed is:

1. A wall of injection moulded thermoplastic material configured to rupture along a predetermined line of weakness under an effect of a force acting on a face of the wall, wherein
the line of weakness is formed by a junction zone, by injection, of a first layer and second layer of material defining respective parts of a surface area of the wall, and
the first and second layers, in the junction zone, include mechanically interlocking shapes such that the first and second layers mechanically interlock with each other.

2. The wall according to claim 1, wherein at least one of the first or second layers includes a mixture comprising at least one plastomer and at least one elastomer.

3. The wall according to claim 2, wherein the mixture comprises polypropylene as the plastomer.

4. The wall according to claim 2, wherein the mixture comprises a styrene-ethylene-butene-styrene copolymer sequence as the plastomer.

5. The wall according to claim 1, wherein the first and second layers mechanically interlock with each other in a vicinity of only one face of the wall.

6. The wall according to claim 1, wherein the first layer includes a rib extending substantially parallel to faces of the wall and at a distance therefrom, the rib enclosed between two regions of the second layer connected to one another via at least one through hole provided in the rib.

7. The wall according to claim 6, wherein the rib includes an enlargement disposed beyond the hole with respect to a remaining part of the first layer.

8. The wall according to claim 5, wherein the first and second layers mechanically interlock with each other in a vicinity of an internal surface of the wall.

9. The wall according to claim 1, wherein a thickness of the wall along the line of weakness is substantially equal to a thickness of each of the first and second layers in a vicinity of the junction zone.

10. The wall according to claim 1, wherein materials of the first and second layers have a different appearance from each other including a different color.

11. A process for producing a wall configured to rupture along a predetermined line of weakness under an effect of a force acting on a face of the wall, the process comprising:
- a first moulding step of forming a first moulding cavity by co-operation of a first mould part and a second mould part, and filling the first moulding cavity by injection of a first material to form a first layer;
- separating the first and second mould parts after cooling the injected material, the first layer remaining attached to the first mould part; and
- a second moulding step of forming a second moulding cavity by co-operation of the first mould part and a third mould part, the said second cavity being substantially the same dimensions of the wall to be formed and being occupied over a part of its surface area and over its substantially entire thickness by the first layer, and filling a remaining volume of the second cavity by injection of a second material to form a second layer.

12. The process according to claim 11 wherein the first mould part includes at least one movable element that projects into the first moulding cavity during the first moulding step and which is withdrawn to free the second moulding cavity during the second moulding step.

13. The process according to claim 12 wherein the movable element is a sliding pin, an end of the sliding pin defining a surface of a rib and during the first moulding step contacting a stud of the second mould part that contains a through hole, a side face of the pin delimiting an enlargement.

14. The process according to claim 11, wherein the first and second materials are injected at a temperature between substantially 180° C. and 240° C.

* * * * *